United States Patent
Ramprasad et al.

(10) Patent No.: US 10,221,467 B2
(45) Date of Patent: Mar. 5, 2019

(54) TUNGSTEN AND VANADIUM SEPARATION

(71) Applicant: CRISTAL USA INC., Hunt Valley, MD (US)

(72) Inventors: Sudhir Ramprasad, Ellicott City, MD (US); Alexandre Fines, Ellicott City, MD (US)

(73) Assignee: CRISTAL USA INC., Hunt Valley, MD (US)

( * ) Notice: Subject to any disclaimer, the term of this patent is extended or adjusted under 35 U.S.C. 154(b) by 0 days.

(21) Appl. No.: 15/578,972

(22) PCT Filed: Jun. 3, 2016

(86) PCT No.: PCT/US2016/035741
§ 371 (c)(1),
(2) Date: Feb. 20, 2018

(87) PCT Pub. No.: WO2016/196949
PCT Pub. Date: Dec. 8, 2016

(65) Prior Publication Data
US 2018/0163283 A1    Jun. 14, 2018

Related U.S. Application Data

(60) Provisional application No. 62/170,980, filed on Jun. 4, 2015.

(51) Int. Cl.
| | | |
|---|---|---|
| *C22B 34/00* | (2006.01) | |
| *C22B 34/36* | (2006.01) | |
| *C22B 3/26* | (2006.01) | |
| *C22B 34/22* | (2006.01) | |

(52) U.S. Cl.
CPC .......... *C22B 34/365* (2013.01); *C22B 3/0005* (2013.01); *C22B 34/22* (2013.01); *C22B 34/225* (2013.01); *C22B 34/36* (2013.01); *Y02P 10/23* (2015.11); *Y02P 10/234* (2015.11)

(58) Field of Classification Search
CPC ....... C22B 3/005; C22B 3/0012; C22B 34/22; C22B 34/225; C22B 34/36; C22B 34/365

USPC ...................................................... 423/54, 63
See application file for complete search history.

(56) References Cited

U.S. PATENT DOCUMENTS

| | | | | |
|---|---|---|---|---|
| 4,298,581 A * | 11/1981 | Douglas | .................. | C22B 34/22 |
| | | | | 423/58 |
| 4,721,606 A * | 1/1988 | Tilley | ........................ | C01F 7/74 |
| | | | | 423/112 |
| 4,726,841 A * | 2/1988 | Grant | ...................... | C01G 5/003 |
| | | | | 210/684 |
| 4,861,565 A | 8/1989 | Sefton et al. | | |
| 8,920,535 B2 * | 12/2014 | Kiyosawa | ............. | C22B 34/365 |
| | | | | 75/401 |

FOREIGN PATENT DOCUMENTS

| | | |
|---|---|---|
| CN | 104263946 | 1/2015 |
| TW | I 295691 | 4/2008 |

OTHER PUBLICATIONS

Luo et al, "Recovery of tungsten and vanadium . . . " Hydrometallurgy, 72, 2004, pp. 1-8. (Year: 2004).*
Luo et al, "A novel process for recovery of tungsten and vanadium . . . " Minerals Engineering, 16, 2003, pp. 665-670. (Year: 2003).*
Ďurišová et al., "Mutual Separation of Vanadium and Tungsten From Aqueous Solution via Electrochemical Reduction and Sorportion Onto Chelating Resin," *Separation Science and Technology*, 2009, vol. 44, No. 12, pp. 2750-2760.

* cited by examiner

*Primary Examiner* — Steven J Bos
(74) *Attorney, Agent, or Firm* — Womble Bond Dickinson (US) LLP (57) ABSTRACT

Methods of isolating tungsten and, in particular, methods of separating tungsten and vanadium are described herein. The methods can generally comprise treating a tungsten-containing material in aqueous solution with a reducing agent suitable for the reduction of pentavalent vanadium to one or more lower oxidation states of vanadium, such that the tungsten can be more readily separated from the vanadium, e.g., via solvent extraction. In certain embodiments, the methods disclosed herein can provide tungsten, vanadium, or both tungsten and vanadium in sufficient purities for commercial use.

25 Claims, 2 Drawing Sheets

FIG. 1

TUNGSTEN AND VANADIUM SEPARATION

CROSS-REFERENCE TO RELATED APPLICATIONS

The present application is a U.S. National Stage of International Patent Application PCT/US2016/035741, filed Jun. 3, 2016, and claims priority to U.S. Provisional Patent Application No. 62/170,980, filed Jun. 4, 2015. The disclosures of each of the applications noted above are incorporated herein by reference in their entirety.

FIELD OF THE INVENTION

The present invention relates to methods for isolating tungsten from various sources and particularly to isolating tungsten in the presence of vanadium. The invention further relates to purified tungsten-containing compositions with high levels of purity (e.g., commercial grade tungsten compositions) obtained using such methods.

BACKGROUND OF THE INVENTION

Tungsten is an important commercial material for the production of e.g., cemented carbides, which are useful for shaping metals, wood, composites, plastics, and ceramics and which are useful in the mining and construction industries. Tungsten is also useful as an element of an alloying material that can be used in steel production. Additionally, tungsten is employed in such applications as lighting filaments, electrodes, electrical and electronic contacts, wires, and metal sheets. For such industrial uses, the principal commercial intermediate that is desired is ammonium paratungstate; accordingly, tungsten is commonly obtained and converted to such a form for various applications.

Likewise, vanadium is also an important commercial material, known to be used in producing rust-resistant springs and high-speed tool steels. Vanadium pentoxide ($V_2O_5$) is known to be used in ceramics, as a catalyst, and in the production of superconductive magnets, and vanadyl sulfate and sodium metavanadate have been used as dietary supplements.

Numerous natural sources of tungsten exist; however, in such sources, tungsten is generally found in combination with one or more other metals. For example, tungsten is commonly found in ores in the form of wolframite (a tungstate of iron and manganese) and scheelite (native calcium tungstate). Numerous secondary sources of tungsten are also known, e.g., from recycling of used tungsten-based materials such as spent catalysts, metal tools, filaments, and the like. Isolation of tungsten from these and other sources and, specifically, separation of tungsten from other metals is often a limiting factor of the use of such sources to obtain tungsten.

For example, significant attention has been focused on separating tungsten from molybdenum. See, for example, U.S. Pat. No. 3,158,438 to Kurtak; U.S. Pat. No. 3,607,008 to Chiola et al.; U.S. Pat. No. 3,969,478 to Zelikman et al.; U.S. Pat. No. 4,275,039 to Ozensoy et al.; U.S. Pat. No. 4,328,190 to Beckstead et al, which are incorporated herein by reference. Another impurity that can hamper the isolation of tungsten from various sources is vanadium; however, few methods are reported for the separation of tungsten and vanadium. The few methods that are known involve precipitation methods for the selective removal of tungsten from mixtures comprising tungsten and vanadium. See Luo et al., Minerals Engineering 16:665-670 (2003); Luo et al., Hydrometallurgy 72(1-2): 1-8 (2004); and U.S. Patent Application Publication No. 2013/0283975 to Kiyosawa et al., which are incorporated herein by reference in their entireties. One method for separating tungsten and vanadium involves electroreduction of vanadium (V) in solution to vanadium (IV) and subsequent sorption of tungsten in the solution onto a selective resin to retain the tungsten and elute the vanadium. See Durisova, Sep. Sci. Tech. 44, 12:2750-2760 (1999), which is incorporated herein by reference. Known methods generally offer low selectivity, require a long reaction time, and/or are applicable only for materials with low metal concentrations, rendering them of limited applicability for many applications.

It would be beneficial to provide effective methods for the isolation of tungsten from mixtures comprising vanadium (i.e., separation of tungsten and vanadium), particularly methods that are applicable across a wide range of metal concentrations. Environmental and sustainability benefits of such methods extend not only to the recovery of tungsten and vanadium, which can be recycled into usable products, but also to decreasing the amount of tungsten and vanadium which must be extracted for ores and recycling catalysts for nitrogen oxide/$NO_x$ reduction (de$NO_x$ catalysts), which otherwise would be disposed of in a landfill.

SUMMARY OF THE INVENTION

The present disclosure provides methods of isolating tungsten and, in particular, to methods of separating tungsten and vanadium. The methods can generally comprise treating a tungsten-containing material in aqueous solution with a reducing agent suitable for the reduction of pentavalent vanadium to lower oxidation states (e.g., including, but not limited to, reduction to tetravalent vanadium). In certain embodiments, the methods disclosed herein can provide tungsten, vanadium, or both tungsten and vanadium in sufficient purities for commercial use.

In one aspect of the invention is provided a method of separating vanadium and tungsten, comprising: providing an aqueous solution comprising vanadium and tungsten; treating the aqueous solution with a reducing agent capable of reducing pentavalent vanadium, i.e., a reducing agent to reduce pentavalent vanadium (e.g., to tetravalent vanadium); mixing the aqueous solution with an organic solvent to form a loaded organic layer and an aqueous raffinate; and separating the loaded organic layer from the aqueous raffinate, wherein the aqueous raffinate comprises about 50% by weight or more of the vanadium in the aqueous solution and the loaded organic layer comprises about 50% by weight or more of the tungsten in the aqueous solution.

In certain embodiments, the aqueous solution is acidic (e.g., with a pH of about 0 to about 5 or about 0 to about 3). In some embodiments, the method further comprises adjusting the pH of the aqueous solution by adding an acid to the aqueous solution.

The makeup of the aqueous solution treated according to the methods disclosed herein can vary. For example, in some embodiments, the aqueous solution comprises spent deNOx catalyst leach solution. The concentration of tungsten in the aqueous solution can be, in certain embodiments, about 1.5 g/L or greater and the amount of vanadium in the aqueous solution can be about 0.1 g/L or greater. In other embodiments, the concentration of tungsten in the aqueous solution can be about 7.5 g/L or greater and the concentration of vanadium in the aqueous solution can be about 0.5 g/L or greater. In still further embodiments, the concentration of tungsten in the aqueous solution can be about 1.5 g/L to about 150 g/L and the concentration of vanadium in the aqueous solution can be about 0.1 to about 10 g/L. The reducing agent employed in the methods disclosed herein can vary and, in some embodiments, the reducing agent comprises an agent selected from the group consisting of zinc, oxalic acid, iron, and sulfur dioxide.

The organic solvent can generally, in some embodiments, comprise one or more (e.g., all three) of an extractant, diluent, and phase modifier. Exemplary extractants include secondary or tertiary amines. In some embodiments, the extractant is selected from the group consisting of trioctylamine, tri-isooctyl amine, and combinations thereof. Exemplary diluents include hydrocarbons (e.g., including, but not limited to, kerosene). Exemplary phase modifiers include alcohols and/or phosphates.

In some embodiments, the methods disclosed herein comprise treating the loaded organic layer to further purify the layer to give a tungsten-enriched material. The methods of further purifying can vary and, in some embodiments, such treating methods comprise scrubbing the loaded organic layer by mixing the loaded organic layer with an aqueous scrubbing solution to give a scrubbed organic comprising the tungsten. In some embodiments, the treating comprises stripping the loaded organic layer by contacting the loaded organic layer with an aqueous stripping solution to give a strip raffinate comprising the tungsten. In certain embodiments, these treatment methods can be used in tandem, e.g., wherein the treating comprises scrubbing as disclosed herein, followed by stripping the scrubbed organic by contacting the scrubbed organic with an aqueous stripping solution to give a strip raffinate comprising the tungsten. The aqueous scrubbing agent can, in certain embodiments, comprise ammonia, hydrochloric acid, sulfuric acid, or a combination thereof. The aqueous stripping solution can, in certain embodiments, comprise ammonium hydroxide.

The treating step can, in some embodiments, provide a tungsten-enriched material that comprises about 25% by weight or less of the vanadium in the aqueous solution; about 15% by weight or less of the vanadium in the aqueous solution; or about 5% by weight or less of the vanadium in the aqueous solution. In some embodiments, the treating step comprises removal of at least a portion of any impurities in the loaded organic layer, wherein the impurities are selected from the group consisting of zinc, molybdenum, aluminum, calcium, chromium, iron, magnesium, manganese, sodium, phosphorus, sulfur, silicon, titanium, zirconium, and combinations thereof. Treating can, in some embodiments, further comprise concentrating the solution after such removal, wherein the tungsten-enriched material comprises about 15% by weight or less of the impurities or about 5% by weight or less of the impurities.

The aqueous raffinate can, in some embodiments, be treated to give a vanadium-enriched material. In certain embodiments, this treating step can comprise mixing the aqueous raffinate with a phosphoric acid-containing extractant (e.g., diethylhexyl phosphoric acid, DEHPA). Such a process typically can provide a vanadium-enriched material by extracting vanadium complexes into the organic layer, giving an organic solution comprising the vanadium after separation from the aqueous layer (wherein the organic vanadium-containing solution can be further treated and/or concentrated).

In another aspect of the present invention is provided a method of separating vanadium and tungsten, comprising: providing a pregnant leach solution arising from the alkaline digestion of spent deNOx catalyst, comprising vanadium and tungsten; modifying the pH of the solution to provide an acidic solution; treating the acidic solution with a reducing agent to reduce pentavalent vanadium (e.g., to tetravalent vanadium); mixing the aqueous solution with an organic solvent to give a loaded organic layer and an aqueous raffinate; separating the loaded organic layer and the aqueous raffinate; contacting the loaded organic layer with an aqueous scrubbing solution to give a scrubbed organic; contacting the scrubbed organic with an aqueous stripping solution to give a strip raffinate; and concentrating the strip raffinate to provide a tungsten-enriched material, wherein the tungsten-enriched material comprises about 50% by weight or more of the tungsten in the pregnant leach solution and about 50% by weight or less of the vanadium in the pregnant leach solution.

In another aspect of the invention is provided a biphasic system, comprising: an aqueous phase comprising vanadium (IV), vanadium(III), vanadium(II), or any combination thereof; and an organic phase comprising tungsten. In certain embodiments, the organic phase comprises about 50% by weight or more of the tungsten in the biphasic system. In certain embodiments, the aqueous phase comprises about 50% by weight or more of the vanadium in the biphasic system. The disclosure further provides, in another aspect of the invention, a tungstate salt obtained from any of the methods disclosed herein.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION OF THE INVENTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. Metal weights provided herein (e.g., weights of tungsten and vanadium) refer to weights of the metal itself (although the metal can be present in various forms, including, in some embodiments, complexed forms).

The invention provides methods for the isolation of tungsten from other metals, particularly from vanadium, in tungsten- and vanadium-containing compositions. Tungsten- and vanadium-containing compositions to which the presently disclosed methods are applicable can vary. Certain tungsten sources generally have relatively high vanadium contents (e.g., spent deNOx catalyst), and in some embodiments, the methods of the present invention may find particular use for obtaining tungsten from such sources. The invention is not limited thereto, and other exemplary compositions that can be advantageously treated according to the methods of the present disclosure include, but are not limited to, products of the alkaline digestion of tungsten ores, products of the acidic digestion of tungsten ores, products of the alkaline digestion of tungsten from secondary sources (e.g., used metal tools comprising tungsten carbide, spent catalysts), and/or products of the acidic digestion of tungsten from secondary sources (e.g., used metal tools comprising tungsten carbide, spent catalysts, etc.). It is noted that the tungsten- and vanadium-containing sources that are relevant in the context of the present disclosure contain at least some percentage of tungsten and at least some percentage of vanadium and can further contain one or more additional metals and/or other impurities.

Figure 1:
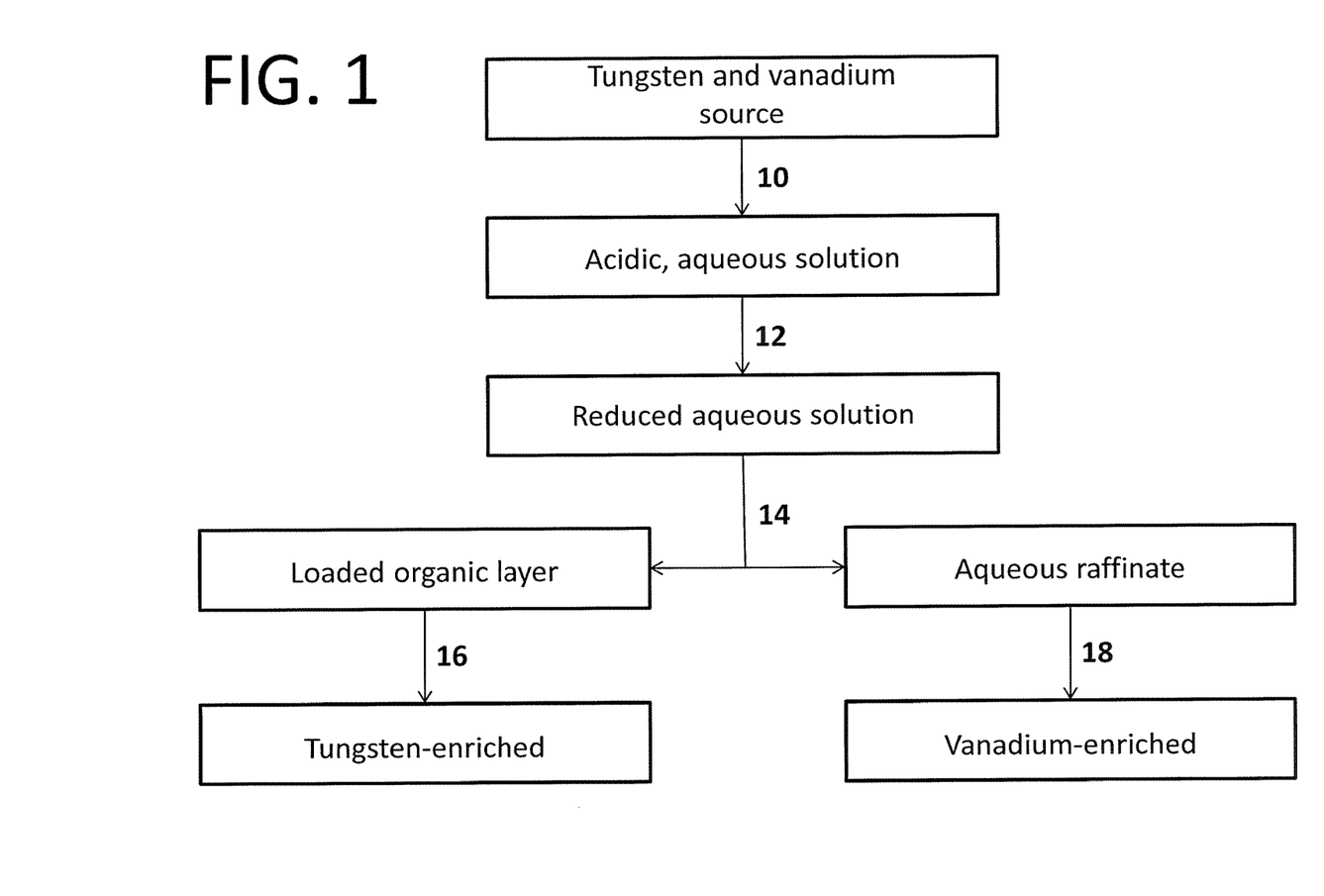
FIG. 1 is a representation of the process steps associated with one embodiment of the presently disclosed method.

In one aspect of the invention, a method is provided for treating a tungsten- and vanadium-containing composition to separate at least a portion of the vanadium from the tungsten and/or to isolate at least a portion of the tungsten and/or vanadium. Representative processing steps that can be employed in certain embodiments of the disclosed methods are shown in FIG. 1. In such embodiments, as shown, a tungsten and vanadium source is treated 10 to provide an acidic aqueous solution; the acidic aqueous solution is reacted 12 with a reducing agent to reduce at least a portion of the pentavalent vanadium present therein (e.g., to tetravalent vanadium); this reduced aqueous solution is extracted 14 with an organic solvent and separated into a loaded organic layer and an aqueous raffinate; the loaded organic layer can be treated (e.g., optionally scrubbed and/or stripped, and concentrated) 16 to provide a tungsten-enriched material and the aqueous raffinate can optionally be treated 18 to provide a vanadium-enriched material.

Step 10 of FIG. 1 is optional and the treatment(s) applied to the tungsten and vanadium source will depend on the nature of the tungsten and vanadium source. Typically, step 10 comprises any steps necessary to ensure that the tungsten and vanadium source is in the form of an acidic, aqueous solution. Typically, compositions to be treated according to the present disclosure are provided as aqueous solutions. If a composition to be treated according to the present disclosure is in a form other than an aqueous solution, step 10 comprises providing the composition in aqueous form. One of skill in the art is aware of methods to provide a material in aqueous form (e.g., by the addition of water thereto at any conditions necessary to dissolve at least a portion of the material). Accordingly, a tungsten- and vanadium-containing aqueous solution is provided (which can include tungsten and vanadium in various forms, such as in the forms of compounds, salts, and/or ions).

"Tungsten" as used herein generally refers to all forms of tungsten, including tungsten compounds, salts, and ions unless otherwise specified and/or unless the context dictates otherwise. Similarly, "vanadium" as used herein generally refers to all forms of vanadium, including vanadium compounds, salts, and ions unless otherwise specified and/or unless the context dictates otherwise. Vanadium generally exists in such aqueous systems in oxidation states ranging from +2 to +5, e.g., including in pentavalent form (+5 oxidation state) and tetravalent form (+4 oxidation state), depending upon the pH and oxidation reduction potential of the solution.

Exemplary concentrations of the tungsten and vanadium in the solutions to which the methods of the present disclosure are applicable can vary. In certain embodiments, the concentration of vanadium in the aqueous solution is about 0.1 g/L or greater or about 0.5 g/L or greater, and the concentration of tungsten in the aqueous solution is about 1.5 g/L or greater or about 7.5 g/L or greater. In some embodiments, exemplary suitable ranges of vanadium concentration are about 0.1 to about 10 g/L (e.g., about 0.5 to about 1 g/L) and exemplary suitable ranges of tungsten concentration are about 1.5 to 150 g/L (e.g., about 7.5 to about 15 g/L).

The ratio of tungsten to vanadium can vary; however, typically, the solutions treated by the method disclosed herein comprise a greater tungsten concentration than vanadium concentration. Exemplary solutions have at least a 2:1 tungsten to vanadium weight ratio, at least a 3:1 tungsten to vanadium weight ratio; at least a 4:1 tungsten to vanadium weight ratio; at least a 5:1 tungsten to vanadium weight ratio; or at least a 10:1 tungsten to vanadium weight ratio. Advantageously, the methods disclosed herein can, in some embodiments, be effective for solutions with relatively high vanadium content. Although not limited thereto, the methods disclosed herein may be applicable in some embodiments to solutions having tungsten to vanadium weight ratios within the range of about 1:1 to about 1000:1, e.g., within the range of about 1:1 to about 500:1; and within the range of about 1:1 to about 250:1, including relatively low tungsten to vanadium weight ratios, such as less than about a 500:1 weight ratio, less than about a 250:1 weight ratio, or less than about a 100:1 tungsten to vanadium weight ratio (e.g., tungsten:vanadium concentration weight ratios of as high as 50:1, 25:1 or 10:1).

In certain embodiments, the overall concentration of tungsten and/or vanadium in a solution to be treated according to the methods disclosed herein may be adjusted prior to such treatment. Methods for adjusting the concentration of tungsten and/or vanadium in such solutions are known (e.g., adding additional water to decrease the metal concentration, evaporating/distilling water from the solution to increase the metal concentration).

Step 10 can, in some embodiments, further comprise adjusting the pH of the aqueous solution to be treated if desired and/or necessary to achieve an acidic pH. Generally, to facilitate the treatment steps of the methods disclosed herein, the tungsten- and vanadium-containing aqueous solution advantageously has an acidic pH. In some embodiments, the aqueous solution is already provided at a sufficient (e.g., acidic) pH and no treatment is necessary. In other embodiments, the aqueous solution must be treated to bring the pH of the solution to a sufficient pH, giving an acidic aqueous solution. One of skill in the art is aware of methods for modifying (e.g., by acid treatment) and monitoring (e.g., using a pH probe) the pH of a solution to provide a solution having a desired pH value. The pH of the aqueous solution in some embodiments can vary from about 0 to about 7, e.g., about 0 to about 5, about 0.1 to about 1, or about 0.5 to about 5 (e.g., about 0.5 to about 1 or about 1 to about 3). In some embodiments, the pH of the aqueous solution is less than about 1 (e.g., between about 0 and about 1). Desirably, the reducing agent used to reduce pentavalent vanadium in the solution is substantially soluble at the pH of the solution (e.g., zinc, an exemplary reducing agent, is typically largely/completely dissolved at a pH value of about 0.5 or below). In certain embodiments, providing a tungsten- and vanadium-containing solution at an acidic pH can help to ensure that a greater proportion of the vanadium present therein is initially in pentavalent form (i.e., with an oxidation state of +5). It is noted that other factors can affect the valence state of the vanadium, including the concentration of vanadium in the solution and the oxidation reduction potential of the solution. Accordingly, modifying these parameters can, in some embodiments, be useful in providing a significant proportion of the vanadium initially in pentavalent form.

General methods for making such modifications to an aqueous solution are known in the art.

As depicted in FIG. 1, step 12 of the embodiment depicted therein comprises reduction of at least a portion of the pentavalent vanadium present in the aqueous tungsten- and vanadium-containing solution to one or more lower oxidation states. In preferred embodiments, a significant portion of the pentavalent vanadium, including nearly all pentavalent vanadium and all pentavalent vanadium in the solution is reduced (i.e., having an oxidation state of IV or less). The application as drafted focuses in large part on the reduction of the pentavalent vanadium in the aqueous solution to tetravalent vanadium; however, the disclosure is not limited thereto. In some embodiments, the pentavalent vanadium can be reduced to provide vanadium(IV) (i.e., tetravalent vanadium), vanadium(III), vanadium (II), or a combination of two or more thereof. In certain embodiments, the reduced aqueous solution comprises tetravalent vanadium (i.e., at least a portion of the vanadium present in the reduced aqueous solution has an oxidation state of IV). In certain embodiments, the vanadium in the reduced aqueous solution is substantially in tetravalent form. In other embodiments, a significant amount of the vanadium in the reduced aqueous solution is in another reduced form (e.g., vanadium(III) and/or vanadium (II)). References to tetravalent vanadium herein are understood to encompass samples comprising vanadium having oxidation states of IV or below (e.g., oxidation states of II-IV).

Typically, the reduction of pentavalent vanadium is facilitated by the use of one or more reducing agents. Reducing agents are generally elements or compounds that donate an electron to a compound, increasing the oxidation state of that compound and decreasing the oxidation state of the reducing agent (in a so-called reduction-oxidation, or redox, reaction). Preferably, according to the present invention, reducing agents capable of reducing pentavalent vanadium without significantly affecting the oxidation state of the tungsten are employed. Exemplary reducing agents to reduce pentavalent vanadium include, but are not limited to, inorganic reagents, e.g., metals having an oxidation potential of about +0.44 to +3.04, including zinc (Zn(0)), iron (Fe(0)) (such as in the form of iron filings), aluminum (Al(0)), sodium (Na(0)), lithium (Li(0)), and the like; and sulfur-containing reagents, including sulfur dioxide ($SO_2$), sodium sulfite, sodium hypophosphite, and the like, as well as organic reagents, e.g., oxalic acid and BRUGGOLITE and/or BLANCOLIN T (sodium formaldehyde sulfoxylate (SFS)).

Although not intending to be limiting, one likely redox reaction that occurs upon the exemplary addition of oxalic acid to vanadium pentoxide present in solution is as follows, wherein Ox is oxalic acid (see Bruyere et al., J. Colloid Interface Sci. 209, 207-214 (1999), which is incorporated herein by reference).

$$V_2O_5(s) + H^+ + 5HOx^- \rightarrow 2VO(Ox)^{2-} + 2CO_2(g) + 3H_2O. \quad \text{(Reaction 1)}$$

The amount of reducing agent added during the reducing step 12 can vary, but is typically that amount sufficient to reduce at least a portion (preferably a significant portion) of the pentavalent vanadium present in the untreated aqueous solution to a lower oxidation state (e.g., providing tetravalent vanadium). Also, the amount of reducing agent added will depend upon the specific reducing agent employed. In one embodiment, granular zinc is employed in an amount of 0.1 to 2 g/100 mL of solution (e.g., 0.2 to 1 g/100 mL of solution).

The reduction can be performed at various temperatures. In certain embodiments, the temperature of the aqueous solution is about 20° C. to about 60° C., such as about 20° C. to about 30° C. Although the atmosphere can vary (e.g., the reaction can be conducted in an inert atmosphere, and can be conducted at elevated or reduced pressure), the reduction is generally conducted at atmospheric pressure in air. The time for which the reducing step is conducted can also very and can depend, at least in part, on the specific reducing agent. The aqueous solution is typically stirred (or shaken or mixed in some manner) in the presence of the reducing agent for a period of time on the order of minutes or hours. For example, in some embodiments, the aqueous solution is treated in this manner for about 5 minutes or more, about 10 minutes or more, about 30 minutes or more, about 1 hour or more, about 2 hours or more, or about 3 hours or more (e.g., including, but not limited to, about 5 minutes to about 5 hours). In some embodiments, the reduction of pentavalent vanadium to tetravalent vanadium is signaled by a color change in the aqueous solution (to a blue color). It is noted that although a color change may signal the reduction of at least a portion of the pentavalent vanadium, in some embodiments, such a color change is not observed, e.g., due to the presence of other colored components in the solution.

It is noted that, although the application as written focuses on embodiments wherein the vanadium is solubilized prior to the reducing step (to form reduced, e.g., tetravalent vanadium), the application is intended to also cover embodiments wherein vanadium is reduced and subsequently solubilized to provide the reduced aqueous solution. For example, a tungsten and vanadium source can be concentrated and treated in solid form (e.g., by heating in a furnace) to effect the reduction of at least a portion of the pentavalent vanadium. The resulting solid material can then be solubilized in aqueous solution (with optional pH adjustment to ensure solubility of the solids) to provide a reduced aqueous solution that can be subjected to the further steps disclosed herein.

The reduced aqueous solution, obtained according to any of the methods disclosed above, is then treated to separate the tungsten and reduced (e.g., tetravalent) vanadium in step 14. Typically, this separation is conducted by extraction of the reduced aqueous solution with an organic extracting solution. Advantageously, the organic extracting solution is substantially immiscible with water (i.e., exhibits low solubility in the aqueous phase). Accordingly, in certain embodiments, the reduced aqueous solution is contacted with an organic extracting solution, the solutions are mixed, and then the mixture is allowed to settle, resulting in phase separation between an aqueous layer ("aqueous raffinate") and a loaded organic layer. The aqueous raffinate (comprising at least a portion of the reduced (e.g., tetravalent) vanadium, and preferably at least about 50% of the vanadium originally present in the reduced aqueous solution by weight, e.g., at least about 60%, at least about 70%, at least about 80%, at least about 90%, at least about 95%, at least about 98%, or at least about 99%) and the loaded organic layer (comprising at least a portion of the tungsten, and preferably at least about 50% of the tungsten originally present in the reduced aqueous solution by weight, e.g., at least about 60%, at least about 70%, at least about 80%, at least about 90%, at least about 95%, at least about 98%, or at least about 99%) can then be separated from one another. This separation can be conducted at various temperatures, but is preferably conducted at a temperature of about ambient temperature or above (e.g., about 20° C. to about 60° C., such as about 20° C. to about 30° C.).

The pH of the reduced aqueous solution subjected to extraction (the "initial pH") can, in some embodiments, impact the separation process. Advantageously, the initial pH is within a range wherein the reduced vanadium is stabilized during the extraction process. Further, the pH of the reduced aqueous solution is within a range sufficient for the extractant(s) present in the organic extracting solution to effectively extract the tungsten species. The initial pH of the reduced aqueous solution subjected to extracting step 14 is typically less than about 7, such that the reduced aqueous solution is acidic. Although not always purposely modified at this stage, it may in some embodiments be desirable to adjust the initial pH of the reduced aqueous solution subjected to extracting step 14. Methods of measuring and adjusting pH values of aqueous solutions are known, e.g., including the addition of acidic or basic solutions to the solution. In particular embodiments, the initial pH of the reduced aqueous solution is adjusted prior to mixing with the organic extracting solution to further acidify the reduced aqueous solution. In certain embodiments, the initial pH of the reduced aqueous solution is adjusted so as to be, e.g., less than about 7, less than about 5, less than about 3, less than about 2, or less than about 1 (e.g., between about 0 and about 5, between about 0 and 3, or between about 0 and about 1).

In some embodiments, it may be desirable to adjust the pH of the reduced aqueous solution during extraction step 14 (e.g., to facilitate the separation process). For example, in some embodiments, it can be advantageous to further acidify the aqueous component (raffinate) during the extraction process. For example, following mixing of the reduced aqueous solution with the organic extracting solution and settling (resulting in phase separation), and typically following separation of the loaded organic layer and the aqueous raffinate, the pH of the aqueous raffinate can be determined and adjusted if desired (e.g., using an acid, such as HCl or $H_2SO_4$). The optionally pH-adjusted raffinate can then be mixed again with the loaded organic layer, repeating the process until the desired pH of the raffinate (the desired "equilibrium pH") is achieved. Such methods are understood in the art and are familiar to one of ordinary skill in the art. The desired equilibrium pH can vary depending upon the particular conditions of the process. However, in some embodiments, a low equilibrium pH is desirable at this stage (e.g., between about 0 and 7, e.g., between about 0 and 2 or between about 0 and 1, such as less than about 5, less than about 3, less than about 2, or less than about 1).

It is noted that exemplary preferred initial and equilibrium pH values for various steps of the disclosed process, as presented herein, are exemplary only. Preferred initial and equilibrium pH values for each step are selected after experimental optimization of the process and/or the individual steps, subject to selection of other parameters of the process. For example, selection of an appropriate initial pH can be affected, for example, by selection of the concentration of various components in the aqueous and organic phases, the aqueous to organic volumetric ratio, the concentration of extractant used, the number of extracting steps employed (disclosed further below), and the like. Selection of an appropriate equilibrium pH can be affected, for example, by the initial pH value, by selection of the concentration of various components in the aqueous and organic phases, the aqueous to organic volumetric ratio, the concentration of extractant used, the number of extracting steps employed (disclosed further below), and the like.

The extracting steps disclosed herein can, in some embodiments, comprise one extracting step (stage) or multiple extracting steps (stages), wherein an aqueous solution is contacted two or more times with an extracting solution, with separation of the organic and aqueous layers after each contact. The extracting solution can be fresh extracting solution for each step (stage), can be recycled, or can be a combination thereof. Each such step involves contacting the aqueous liquid (reduced aqueous solution in the first stage, separated aqueous raffinate in subsequent stages) with organic extracting solution, mixing the solutions, and allowing them to settle, resulting in phase separation between an aqueous raffinate and a loaded organic layer. The aqueous raffinate and loaded organic layer are separated following one or more such steps and, in some embodiments, multiple loaded organic layers (arising from multiple stages) can be combined for further processing. In some embodiments, the number of stages advantageously employed to effect the desired isolation of tungsten is correlated with the equilibrium pH. For example, in certain embodiments, the equilibrium pH may affect the number of stages used to achieve sufficient extraction of tungsten into the organic phase. These values can, in some embodiments, depend further, e.g., on the aqueous:organic volumetric ratio used in the extraction.

The organic extracting solution can vary and generally comprises one or more components sufficient to extract at least a portion of the tungsten into the organic phase (giving a loaded organic layer) while at least a portion of the reduced vanadium is maintained in the aqueous phase (giving an aqueous raffinate). Advantageously, the organic extracting solution is desirably selected such that no component thereof reacts substantially with the reduced (e.g., tetravalent) vanadium to form organic-soluble complexes with the reduced vanadium. Extracting solutions, in some embodiments, can comprise one or more of an extractant (or extractants), a phase modifier, and a diluent.

Extractants useful according to the disclosed methods commonly comprise moieties that form complexes with the tungsten (e.g., an organic-soluble complex). Extractants that are useful in the methods disclosed herein include, but are not limited to, tertiary and secondary amines. Amines can, in some embodiments, preferably react with tungsten present in the reduced aqueous solution to give a species that is soluble in the organic phase. Certain amine extractants preferably include two or three aliphatic chains (e.g., C8-C10 chains) that can be saturated or unsaturated and linear or branched. Certain specific exemplary extractants include, but are not limited to, di-iso tri-decylamine, trioctylamine, tricapryl amine, tri-iso octylamine, tridecylamine, trilaurulamine, trioctyl methyl ammonium chloride, and combinations thereof. One exemplary commercially available trioctylamine that can be employed as an extractant is ALAMINE® 336 (BASF) (a symmetrical straight chain saturated tertiary amine). Other commercially available amines that can be employed in certain embodiments include ALAMINE® 304 (trilaurylamine), ALAMINE® 308 (triisooctylamine), and ALAMINE® 310 (triisodecylamine) (all from BASF).

An exemplary reaction demonstrating such embodiments is provided below (where R is any substituted or unsubstituted organic, e.g., alkyl group and m and n represent any non-zero integers). This exemplary reaction is not intended to be limiting, and it is understood that the specific reactions depend on the conditions (e.g., pH, temperature, moieties present, etc.) and may vary as a result.

$$5(R_3NH)^+ + 2.5SO_4^{2-} + 5Na^+ + (HW_6O_{21})^{5-} \rightarrow (R_3NH)_5(HW_6O_{21}) + 2.5SO_4^{2-} + 5Na^+$$ (Reaction 2)

Phase modifiers useful according to the disclosed methods commonly are components that improve phase separation and assist in preventing the formation of undesirable emulsions in the organic phase. Phase modifiers that are useful in the presently disclosed methods include alcohols (e.g., long-chain aliphatic alcohols, such as C6-C30 alcohols) and phosphates, including trialkyl phosphates (organic phosphorus oxides). Certain exemplary phase modifiers include, but are not limited to, 1-decanol, isodecanol, 2-ethyl hexanol, nonylphenol, and tributylphosphate (TBP). One exemplary commercially available phase modifier that can be employed in the organic extracting solutions described herein is EXXAL® 10 (isodecyl alcohol) (ExxonMobil Chemicals).

Diluents useful according to the disclosed methods can serve to decrease the viscosity of the organic extracting solution and improve the hydrodynamics of the extraction process. Typically, diluents are inert under the extraction conditions, since strong interactions (e.g., with the extractant) typically reduce extraction efficiency. Exemplary diluents are hydrocarbons, including but not limited to, kerosene and aromatic hydrocarbons (e.g., including, but not limited to, xylene, toluene, benzene, and mixtures thereof). Commercially available diluents include Kerosene (e.g., purum grade, from Sigma Aldrich), ESCAID™ Fluids (hydrocarbon fluids) (ExxonMobil Chemicals), and AROMATIC™ Fluids (aromatic fluids) (ExxonMobil Chemicals). Other exemplary components (e.g., extractants, phase modifiers, and/or diluents) are disclosed, for example, in U.S. Pat. No. 4,328,190 to Beckstead et al.; U.S. Pat. No. 4,092,400 to Zbranek, and U.S. Pat. No. 3,158,438 to Kurtak, which are incorporated herein by reference.

The ratio of components in the organic extracting solution used in the presently disclosed methods can vary. For example, the concentration of extractant can be varied. In some embodiment, the extractant can be used in an amount of about 1 to about 50 percent by volume, such as in an amount of about 2 to about 20 percent by volume, and, in some embodiments, an amount of about 5 to about 20 percent by volume. In particular embodiments, the extractant can be used in an amount of about 5 percent by volume or more, about 10% by volume or more, or about 15% by volume or more.

The amount of diluent and phase modifier in the organic extracting solution can also vary and the amounts of one or both of these components are typically sufficient to make up the remainder of the organic extracting solution. Exemplary concentrations of diluent in the organic extracting solution are about 30 to about 93% by volume, such as about 30% to about 85% by volume. Exemplary concentrations of phase modifier in the organic extracting solution are about 5% to about 50% by volume. In some embodiments, the organic extracting solution comprises both a diluent and a phase modifier in addition to the extractant. In certain embodiments, a diluent and a phase modifier are used in roughly equivalent volumetric amounts (e.g., about 1.5:1 to about 1:1.5 diluent:phase modifier volume). It is noted that the specific extractant and/or diluent used may affect how much (if any) phase modifier is beneficial to enhance the separation. Additionally, the initial pH may, in some embodiments, affect the amount of phase modifier that is beneficial. For example, at lower initial pH values, more phase modifier may be advantageously used (e.g., to eliminate the formation of a third phase in the extraction, reducing efficiency).

The volumetric ratio of reduced aqueous solution to organic extracting solution can vary and may affect the amount of tungsten that is extracted into the organic layer. In some embodiments, the volumetric ratio of the organic extracting solution to the reduced aqueous solution is such that the mixture comprises more organic extracting solution than reduced aqueous solution and in other embodiments, the volumetric ratio of the organic extracting solution to the reduced aqueous solution is such that the mixture comprises less organic extracting solution than reduced aqueous solution. Although not intended to be limiting, in certain embodiments, the volumetric ratio of reduced aqueous solution to organic extracting solution is about 1:20 to about 20:1. In certain embodiments, an excess of organic extracting solution is employed (e.g., a volumetric ratio of reduced aqueous solution to organic extracting solution of about 1:20 or greater or about 1:15 or greater, such as between about 1:20 and about 1:1, between about 1:15 and about 1:1, or between about 1:10 and about 1:1, such as a volumetric ratio of about 1:2, 1:4, 1:6, 1:8, 1:10, or 1:15). In other embodiments, a lesser amount of organic extracting solution is employed (e.g., a volumetric ratio of reduced aqueous solution to organic extracting solution of about 20:1 or less or about 15:1 or less, such as between about 20:1 and about 1:1, between about 15:1 and about 1:1, or between about 10:1 and about 1:1, such as a volumetric ratio of about 2:1, 4:1, 6:1, 8:1, 10:1, or 15:1). In some embodiments, the organic extracting solution and reduced aqueous solutions are employed in substantially equal amounts (e.g., a volumetric ratio of about 1.5:1 to about 1:1.5, such as about 1:1).

It is noted that the parameters used to carry out steps 10 through 14 can depend, in large part, on the composition of the material to be treated. For example, in step 10, the specific source of the tungsten can dictate the types of treatments required to provide the acidic aqueous solution. Further, the amount of vanadium present in the acidic aqueous solution to be treated may impact, for example, the amount of reducing agent needed to effect the conversion of a substantial portion of the pentavalent vanadium to vanadium having a lower oxidation state (e.g., tetravalent vanadium), the amount of extractant to effectively separate the tungsten from the vanadium, the number of stages to effectively extract/wash the solutions, etc.

Figure 2:
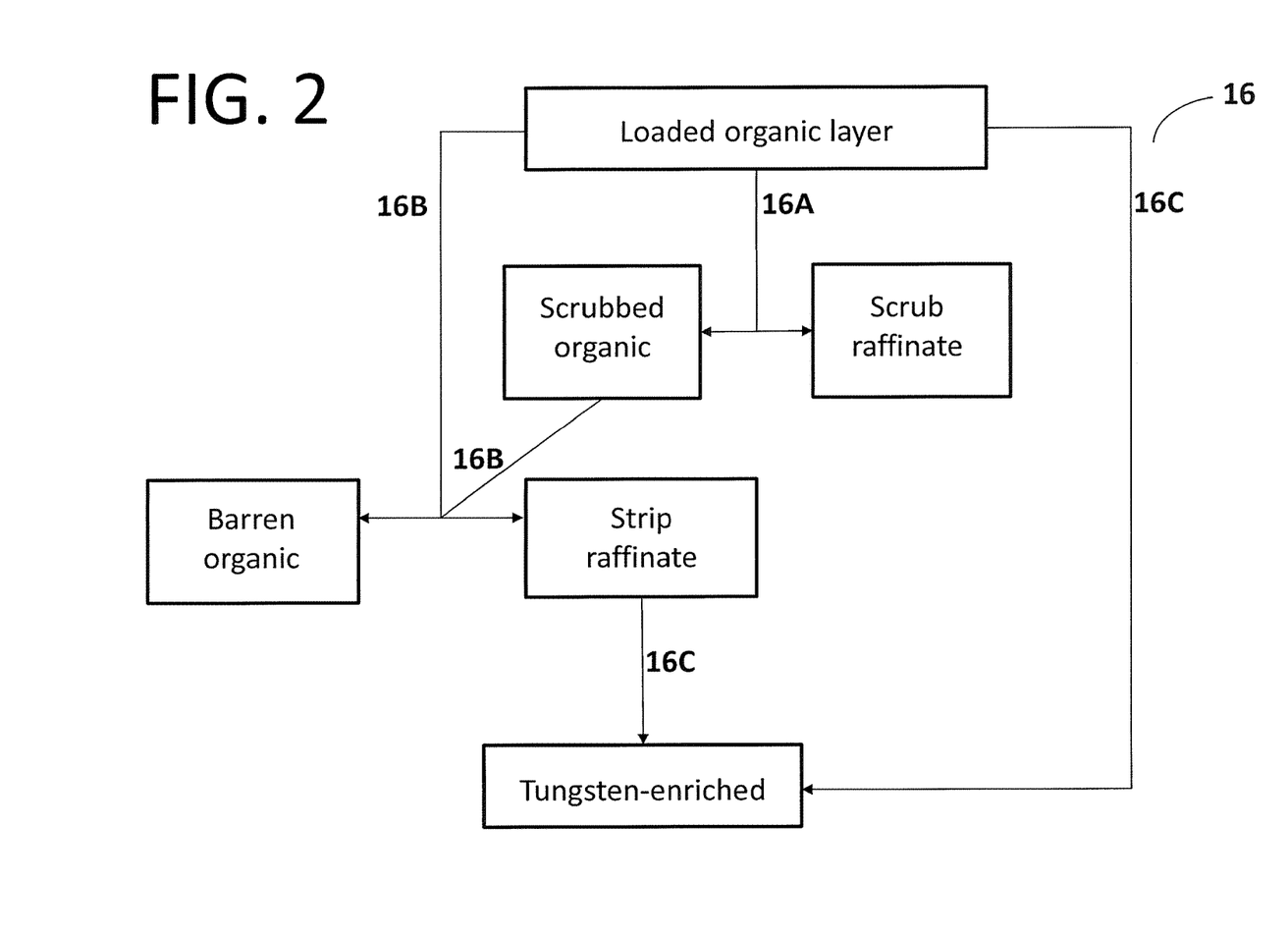
FIG. 2 is a representation of a subset of process steps associated with the embodiment in FIG. 1.

Steps 16 and 18, as shown in FIG. 1, comprise processing the loaded organic layer and aqueous raffinate to give a tungsten-enriched material and, optionally, a vanadium-enriched material, respectively. Step 16 is further detailed in FIG. 2. It is noted that the usefulness of the certain specific sub-steps of step 16, i.e., scrubbing, 16A and stripping, 16B, depends on the composition of the loaded organic layer being treated. For example, where the loaded organic layer comprises a substantial amount of vanadium and/or other metals, scrubbing can be particularly beneficial to provide a tungsten-enriched material having a high level of purity. However, there may be little benefit to subjecting a loaded organic layer that is substantially pure in tungsten species to a scrubbing process.

Where employed, sub-step 16A involves contacting the loaded organic layer comprising tungsten, with a scrubbing agent. Typically, this scrubbing sub-step comprises contacting the loaded organic layer with an aqueous scrubbing agent, mixing the loaded organic layer and the aqueous scrubbing agent to thoroughly mix, and letting the mixture settle, resulting in phase separation between an aqueous scrub raffinate and the scrubbed organic. The aqueous scrub raffinate (comprising at least a portion of the impurities, i.e., non-tungsten-containing moieties that may be present in the loaded organic layer) and the scrubbed organic (comprising a substantial portion of the tungsten) can then be separated from one another.

The volumetric ratio of aqueous scrubbing agent to organic layer can vary; in some embodiments, an excess of aqueous scrubbing agent can be used and in other embodiments, the organic layer is present in excess (e.g., a volumetric ratio of about 20:1 aqueous:organic to a volumetric ratio of about 1:20 aqueous:organic or a volumetric ratio of about 10:1 aqueous:organic to a volumetric ratio of about 1:10 aqueous:organic). Although not required, this scrubbing process is typically followed by washing the scrubbed organic with water. The scrubbing step and the optional washing step can comprise one or multiple scrubbing stages, using fresh and/or recycled scrubbing agent and water, respectively. Scrubbing as described herein can be conducted at various temperatures, but is preferably conducted at a temperature of about ambient temperature or above (e.g., about 20° C. to about 60° C., such as about 20° C. to about 30° C.).

Scrubbing agents are compositions that remove one or more undesirable components from a solution (e.g., the organic layer provided by step 14) and thus can help to provide the desirable component (e.g., the tungsten) in a higher overall concentration. The scrubbing agent, where used, advantageously removes at least some co-extracted impurities (e.g., co-extracted metal impurities) that may be present with tungsten in the loaded organic layer. Such co-extracted impurities can include, but are not limited to, one or more of zinc, molybdenum, aluminum, calcium, chromium, iron, magnesium, manganese, sodium, phosphorus, sulfur, silicon, titanium, and zirconium. For example, in certain embodiments, the scrubbing agent used to treat the organic layer is effective in removing at least a portion of any vanadium and/or zinc remaining in the organic layer. In certain embodiments, the scrubbing agent used to treat the loaded organic layer is effective in removing at least a portion of any molybdenum typically present therein. Certain such scrubbing agents are known, e.g., as reported in "Applications of Ion Exchange," in Hydrometallurgy in Extraction Processes Vol. 2: CRC Press 1990, p. 104 (reporting the use of sodium carbonate scrub to separate tungsten and molybdenum), which is incorporated herein by reference.

Exemplary scrubbing agents for use in scrubbing sub-step 16A include, but are not limited to, acids such as hydrochloric acid, sulfuric acid, phosphoric acid, and combinations thereof. In some embodiments, sulfuric acid can be used as a scrubbing agent in varying concentrations, ranging from concentrated (about 37N) solutions to dilute solutions. Certain exemplary concentrations of sulfuric acid that are not intended to be limiting include concentrations of at least about 1.0N sulfuric acid or at least about 1.25N sulfuric acid, such as within the range of about 1N to about 3N sulfuric acid, although it is to be understood that more concentrated (including significantly more concentrated) solutions can be used.

Advantageously, the scrubbing agent(s) selected for this step have reasonable to good selectivity between tungsten and vanadium to avoid removing significant amounts of tungsten while removing one or more co-extracted impurities. For example, it is preferred that the scrubbing results in the removal of about 5% by weight or less of the tungsten in the loaded organic layer, about 2% by weight or less of the tungsten in the loaded organic layer, about 1% by weight or less of the tungsten in the loaded organic layer, about 0.5% by weight or less of the tungsten in the loaded organic layer, or about 0.1% by weight or less of the tungsten in the loaded organic layer. The amount of undesirable co-extracted impurities removed from the loaded organic layer in this scrubbing step can vary but is advantageously maximized. In certain embodiments, about 50% by weight or more of any zinc remaining in the loaded organic layer is removed, and/or about 20% by weight or more of the vanadium remaining in the loaded organic layer is removed.

Step 16 can further comprise subjecting the loaded organic layer (or the scrubbed organic) to a stripping agent (sub-step 16B in FIG. 2) for the selective removal of tungsten from the loaded organic layer (or scrubbed organic) to an aqueous strip raffinate, leaving at least a portion of the impurities in the loaded organic layer (or scrubbed organic) behind. Typically, this stripping sub-step comprises contacting the loaded organic layer (or scrubbed organic) with an aqueous stripping agent, mixing the organic layer and the aqueous stripping agent to thoroughly mix, and letting the mixture settle, resulting in phase separation between a barren organic and an aqueous strip raffinate. The strip raffinate (comprising a substantial part of the tungsten) and the barren organic (comprising at least a portion of the impurities, i.e., non-tungsten-containing compounds, ions, salts, and the like) can then be separated from one another.

Again, the initial and equilibrium pH associated with the strip raffinate obtained in this separation step can vary and can be adjusted as described above. Following mixing with the organic extracting solution and settling (resulting in phase separation), the equilibrium pH of the strip raffinate layer can vary. Typically, equilibrium pH values at this stage are basic (i.e., above 7). For example, representative equilibrium pH values are within the range of about 7 to about 12, about 8 to about 12, or about 9 to about 11. In some embodiments, it is beneficial to control the equilibrium pH during and/or following stripping sub-step 16B.

The volumetric ratio of aqueous stripping agent to loaded organic layer (or scrubbed organic) can vary; in some embodiments, an excess of aqueous stripping agent can be used and in other embodiments, the loaded organic layer (or scrubbed organic) is present in excess (e.g., a volumetric ratio of about 10:1 aqueous:organic to about 1:10 aqueous:organic, such as about 1:2, about 1:4, about 1:1, about 2:1, or about 4:1). To maximize tungsten recovery in the aqueous strip raffinate, it may be advantageous to employ an excess of aqueous stripping agent (e.g., a volumetric ratio of at least about 2:1 aqueous:organic, such as between about 2:1 aqueous:organic and about 20:1 aqueous:organic or between about 2:1 aqueous:organic and about 10:1 aqueous:organic). Although an excess of aqueous stripping agent with respect to the organic solution being stripped can be desirable, it is noted that a very high aqueous:organic volumetric ratio may advantageously be avoided to maximize the efficiency of the overall process. In some embodiments, water will ultimately be removed (e.g., by evaporation) to provide the purified, tungsten-enriched material and the addition of a large excess of water requires the removal of more water to provide the final product, thus negatively impacting the efficiency. Accordingly, in certain embodiments, an excess of aqueous stripping agent is used but the aqueous:organic volumetric ratio is about 20:1 or less, about 10:1 or less, about 8:1 or less, about 6:1 or less, about 5:1 or less, or about 4:1 or less.

Advantageously, a majority of the tungsten present in the loaded organic layer (or scrubbed organic) is extracted into the aqueous phase (giving a strip raffinate) in the stripping sub-step. For example, at least about 90% by weight, at least about 95%, by weight, at least about 98% by weight, at least about 99% by weight, or about 100% by weight of the tungsten present in the loaded organic layer (or scrubbed organic) is desirably present in the strip raffinate after stripping sub-step 16B. The stripping step can comprise one or multiple stripping sub-steps (stages), using fresh stripping agent for each repetition (stage) (e.g., in a cross flow process) and/or stripping agent recycled from previous stages (e.g., in a counter current process or cross flow, counter current process). Each such step involves contacting the organic layer (loaded organic layer or scrubbed organic in the first stage, stripped/barren organic layer in subsequent stages) with stripping agent, mixing the solutions, and allowing them to settle, resulting in phase separation between an aqueous layer and an organic layer. The aqueous layer and organic layer are separated (giving a barren organic and a strip raffinate) and, in some embodiments, multiple aqueous layers (arising from multiple stages) can be combined into a single strip raffinate.

In some embodiments, the number of stages advantageously employed to effect the desired isolation of tungsten is correlated with the equilibrium pH. For example, in certain embodiments, the equilibrium pH may affect the number of stages used to achieve sufficient extraction of tungsten into the aqueous phase. These values can, in some embodiments, depend further on, e.g., the organic:aqueous volumetric ratio used in the extraction. Stripping as described herein can be conducted at various temperatures, but is preferably conducted at a temperature of about ambient temperature or above (e.g., about 20° C. to about 60° C., such as about 20° C. to about 30° C.). Exemplary stripping agents for use in stripping step 16B include, but are not limited to, aqueous solutions of ammonium hydroxide in varying ratios (e.g., at least about 2% v/v, e.g., about 2% to about 10% v/v, such as about 5% v/v). Other stripping agents include sodium hydroxide, sodium carbonate, ammonium chloride, or any combination thereof. Advantageously, a stripping agent is selected such that it provides a basic equilibrium pH (i.e., an equilibrium pH within the range of about 7 to about 14, e.g., between about 8 and about 10) in the strip raffinate.

As one specific example, the tungsten in the loaded organic layer (or the scrubbed organic) may comprise tungsten in the form of an ion associate complex, i.e., $(R_3NH)_5(HW_6O_{15})$. Although not intended to be limiting, where an ammonium hydroxide solution is used as a stripping agent, it is believed that the ion associate complex is decomposed, allowing the isopolytungstate resulting therefrom to be back extracted into the aqueous phase as an ammonium salt, as represented in the following reaction 3 (where R is any substituted or unsubstituted organic, e.g., alkyl group).

(Reaction 3)

Accordingly, in certain embodiments, the tungsten-enriched material can comprise tungsten in the form of ammonium meta tungstate, ammonium para tungstate, and/or combinations thereof, although these forms are not intending to be limiting.

Step 16 can, in some embodiments, further comprise concentrating the loaded organic layer and/or the strip raffinate (sub-step 16C in FIG. 2) and thus can provide a tungsten-enriched material (e.g., in solid form). Concentrating can be performed as generally known in the art (e.g., by evaporating the liquid from the solution, i.e., evaporative crystallization).

The resulting tungsten-enriched material can be provided in solution, dispersion, semi-solid, or solid form, and is preferably provided in solid form. The tungsten-enriched material can contain, for example, about 50% or more by weight of tungsten-containing species (e.g., tungsten, tungsten compounds, tungsten salts, and/or tungsten ions), about 60% or more, about 70% or more, about 80% or more, about 90% or more, about 95% or more, or about 99% or more (e.g., about 50-100%, about 70-100%, about 80-100%, about 90-100%, about 95-100%, or about 99-100% tungsten-containing species). Advantageously, in certain embodiments, the tungsten-enriched material comprises about 10% or less by weight of vanadium, about 5% or less by weight of vanadium, about 2% or less by weight of vanadium, about 1% by weight or less of vanadium, about 0.5% or less by weight of vanadium, or about 0.1% or less by weight of vanadium. In some embodiments, the tungsten-enriched material contains less than about 300 ppm vanadium, less than about 200 ppm vanadium, less than about 100 ppm vanadium, or less than about 50 ppm vanadium (as analyzed by ICP). The reduction in vanadium from the starting material to the tungsten-enriched material can vary, depending on a range of factors, including the amount of vanadium in the starting material and the specific process parameters employed in the processing steps to which the starting material is subjected to provide the tungsten-enriched material. Exemplary percent reductions in vanadium from a starting material to a tungsten-enriched material include at least about a 50% decrease in vanadium content, at least about a 75% decrease in vanadium content, or at least about a 90% decrease in vanadium content. One particular embodiment provides a method beginning with a starting material having a vanadium content of about 600 ppm vanadium and resulting in a tungsten-enriched material having a vanadium content of less than 300 ppm, less than 250 ppm, less than 200 ppm, less than 150 ppm, less than 100 ppm, or less than 50 ppm.

In some embodiments, the tungsten-enriched material comprises very little of any metal species other than tungsten. For example, in some embodiments, the tungsten-enriched material can contain about 20% or less by weight of metal species other than tungsten-containing species, e.g., about 15% or less, about 10% or less, about 5% or less, about 2% or less, about 1% or less, about 0.5% or less, or about 0.1% or less by weight of metal species other than tungsten-containing species (e.g., about 0-15%, about 0-10%, about 0-5%, or about 0-1% metal species other than tungsten-containing species). Further, the tungsten-enriched material can, in certain embodiments, contain low amounts of other impurities (including, but not limited to, phosphorus-containing species, sulfur-containing species, and silicon-containing species). Accordingly, in some embodiments, the amount of zinc-, molybdenum-, aluminum-, calcium-, chromium-, iron-, magnesium-, manganese-, sodium-, phosphorus-, sulfur-, silicon-, titanium-, and zirconium-containing species in the tungsten-enriched material is about 10% by weight or less, about 5% by weight or less, about 2% by weight or less, about 1% by weight or less, about 0.5% by weight or less, or about 0.1% by weight or less (e.g., about 0-15% by weight, about 0-10% by weight, about 0-5% by weight, or about 0-1% by weight).

In one specific embodiment, the tungsten-enriched material is in the form of ammonium tungstate. The ammonium tungstate, in some embodiments, exhibits very low levels of various impurities and, in particular, exhibits very low levels of sodium, zinc, and vanadium. For example, one exemplary tungsten-enriched material provided according to the methods disclosed herein comprises ammonium tungstate and comprises about 45 ppm or less sodium, about 15 ppm zinc or less, and about 250 ppm or less vanadium.

Step 18 of FIG. 1 comprises optionally providing a vanadium-enriched material from the aqueous raffinate provided by step 14. Methods for providing such a vanadium-enriched material can vary. For example, in some embodiments, the aqueous raffinate can be contacted with an organic extracting solution to extract complexed vanadium into the organic phase, leaving certain impurities in the aqueous phase. Although not intended to be limiting, organic phosphoric acids (i.e., in the form of a phosphoric acid-containing extractant) can, in some embodiments, preferably react with vanadium present in the aqueous raffinate to give a complexed vanadium species that is soluble in the organic phase, which can be separated from the aqueous layer (which preferably contains a majority of any non-vanadium species present in the aqueous raffinate). One exemplary organic phosphoric acid is di-2-ethyl hexyl phosphoric acid (DEHPA).

An exemplary reaction demonstrating this embodiment is provided below in Reaction 4 (where HA is an organic phosphoric acid (e.g., DEHPA) and m and n represent any non-zero integers). This exemplary reaction is not intended to be limiting, and it is understood that the specific reactions depend on the conditions (e.g., pH, temperature, moieties present, etc.) and may vary as a result.

$$n\text{VO}^{2+}+m(\text{HA})_2(\text{org}) \rightarrow (\text{VO})_n(\text{A})_{2n}(\text{HA})_{2(m-n)}+2n\text{H}^+ \quad \text{(Reaction 4)}$$

Alternate methods for purifying a vanadium-containing solution are known and can be employed to treat the aqueous raffinate in the context of the presently disclosed methods. Step 18 can comprise providing a vanadium-enriched material in various forms (e.g., in solid form). The vanadium-enriched material can contain, for example, about 50% or more by weight of vanadium-containing species (e.g., vanadium, vanadium compounds, vanadium salts, and/or vanadium ions), about 60% or more, about 70% or more, about 80% or more, about 90% or more, about 95% or more, or about 99% or more.

It is noted that, within the processes disclosed herein, various components employed in or resulting from the individual method steps can be recycled as desired. For example, in certain embodiments, the strip raffinate can be recycled for further use. In some embodiments, the barren organic can be recycled for further use. One of skill in the art would understand means for determining which components are suitable for recycling and would identify methods for effecting such recycling of one or more components used in the processes disclosed herein, e.g., to enhance the efficiency of the overall separation process.

Further, in certain embodiments, methods and reagents described herein can be used in an order other than that specifically disclosed above. For example, in certain embodiments, the reduced aqueous solution can be contacted in step 14 with an organic extracting solution comprising an organic phosphoric acid (e.g., DEHPA) to complex the vanadium and extract the vanadium into the organic layer, rather than with an organic extracting solution comprising an amine or other component to complex the tungsten and extract the tungsten into the organic layer. In such embodiments, the resulting aqueous raffinate would comprise at least a portion of the tungsten originally present in the reduced aqueous solution and the method can further comprise treating the aqueous raffinate (e.g., by one or more of extracting the aqueous raffinate with an amine or other component to complex the tungsten and extract the tungsten into the organic layer, scrubbing, stripping, and/or concentrating) to provide the tungsten-enriched material. Similarly, the loaded organic layer in such embodiments would comprise at least a portion of the reduced (e.g., tetravalent) vanadium originally present in the reduced aqueous solution and the method can further comprise treating the loaded organic layer (e.g., by one or more of scrubbing, stripping, and/or concentrating) to give a vanadium-enriched material.

EXPERIMENTAL

The present invention is more fully illustrated by the following examples, which are set forth to illustrate the present invention and is not to be construed as limiting thereof. Unless otherwise noted, all parts and percentages are by weight, and all weight percentages are expressed on a dry basis, meaning excluding water content, unless otherwise indicated.

The experimental setups generally involved a glass separatory funnel (250 mL capacity) with a teflon stopcock, magnetic stirrer, teflon stir bar, eppendorf micropipettes, pH meter with capabilities to measure temperature and oxidation potential, and laboratory glassware (beakers, volumetric flasks etc.).

Desired volumes of solution (e.g., synthetic metal solution or pregnant leach solution, PLS) were contacted with an organic solvent in a glass beaker using a magnetic stir bar for the desired amount of time. To ensure reproducibility, a magnetic stirrer was used throughout these studies to mix aqueous and organic phases and to minimize inconsistencies caused by manual shaking of a separation funnel. After the contacting time elapsed, mixtures were immediately transferred to a 250 mL separatory funnel. The liquid components were allowed to settle for a desired amount of time. Aqueous and organic layers were separated after a distinct phase separation was visible. The aqueous solution was analyzed for metal characterization. The metal content in the organic phase was calculated as the difference between the metal content in the initial solution (e.g., PLS) and the metal content in the aqueous layer. In the case of experiments with PLS, the organic layer was scrubbed with a dilute acid and washed with water. The scrubbed organic was mixed with ammonium hydroxide solution using the similar process for extraction and the aqueous layer (strip raffinate) was separated from the barren organic layer. All shakeout tests were performed at room temperature and at ambient pressure. The mixing time, initial solute concentration in the feed, and equilibrium pH were maintained constant in all the extraction and stripping isotherm studies.

The metal content in the aqueous solutions was analyzed by an inductively coupled spectrometer (ICP) (Thermo Scientific, iCAP 6000 series). Calibration standards of 1, 2, and 5 ppm for vanadium and standards of 2.5, 5 and 10 ppm for tungsten were employed in the quantitative analysis of these elements. The pH and the oxidation reduction potential (ORP) in conjunction with a temperature probe were measured using Thermo Scientific Orion VersaStar Advanced Electrochemistry Meter. A pH electrode with a polymeric body was used throughout these studies. Fresh pH buffers (1, 2, 4, 7 and 10) were used for pH calibration and the pH meter was calibrated before daily use. The calibration curve had a linear regression of >96% for all the tests. The ORP was calibrated using the standard (Ag/AgCl) solution before measuring the ORP of the samples. All tungsten and vanadium concentration reported in these studies are as W and V quantified by ICP in mg/L, unless otherwise specified.

All chemical reagents used were ACS grade and used without any modifications. Sodium tungstate dihydrate (Sigma Aldrich) was used as the source of tungsten for studies with synthetic solution. Granular zinc metal, 20 mesh (Baker & Amson) was used as a reducing agent. Vanadium pentoxide (Spectrum Chemicals) was used as the source of vanadium for studies with synthetic solution.

Trioctylamine (Sigma Aldrich), EXXAL 10 alcohol (isodecyl alcohol, Exxon Mobil) and kerosene (purum grade, Sigma Aldrich) were employed as organic solution components. The kerosene used has a density of 0.8 g/cm$^3$ at 25° C., boiling point 175-325° C., flash point of 81° C. The Exxal 10 alcohol used has a density of 0.836 g/cm$^3$ at 25° C., boiling point 216-226° C. Distribution coefficients and % extraction were calculated using the following formulae:

$$D_e = \frac{\text{metal concentration in organic phase}}{\text{metal concentration in aqueous raffinate}}$$

$$\% \text{ Extraction} = \frac{D_e \times 100}{\left(D_e + \frac{V_{aqueous}}{V_{organic}}\right)}$$

Example 1: Reduction of Pentavalent Vanadium

To demonstrate that pentavalent vanadium could be effectively reduced, zinc metal was added to an aqueous solution of 0.8 g/L of pentavalent vanadium (in the form of vanadium pentoxide) such that a zinc to vanadium molar ratio of 3.0 was achieved. The resulting yellow solution with visible zinc residue at the bottom of the vessel was stirred at room temperature for 4 hours. After 1 hour, the solution turned blue and no zinc residue at the bottom of the vessel was observed. The resulting blue solution had a pH of 0.35 and an oxidation reduction potential of 750 mV.

To demonstrate that tungsten could be effectively extracted from the reduced vanadium, the reduced vanadium solution was contacted with an extracting solvent comprising 15% v/v trioctylamine, 40% v/v EXXAL 10 alcohol (isodecyl alcohol, Exxon Mobil), and 45% v/v kerosene in a volumetric ratio of reduced vanadium solution to extracting solvent of 1:1. The mixture was magnetically stirred and the layers were separated using a separatory funnel. It was visually observed that the blue color associated with tetravalent vanadium was retained in the separated aqueous raffinate, indicating that the tetravalent vanadium was not extracted in any significant amount into the loaded organic layer. Vanadium content in the aqueous raffinate was evaluated by mass balance. Inductively coupled plasma (ICP) analysis further confirmed the presence of vanadium in the aqueous raffinate.

Example 2: Reduction of Pentavalent Vanadium in the Presence of Tungsten

A pregnant leach solution (PLS) arising from the alkaline digestion of spent deNOx catalyst, known to contain vanadium and tungsten was provided, having a pH of 13. The pH of the solution was adjusted to 1.0 using 6N HCl (aq). Granular zinc metal was added to the solution and the concentration of dissolved zinc was quantified by ICP analysis as shown in Table 1.

A first aliquot of the solution was adjusted to a pH of 0.4 and mixed with an organic extracting solvent comprising 15% by volume trioctylamine, 40% by volume Exxal 10 alcohol, and 45% by volume kerosene. An aqueous:organic volumetric ratio of 1:1 was employed. The biphasic system was stirred in a beaker with a magnetic stirrer, the system was transferred to a separatory funnel, and the layers were allowed to separate. The loaded organic layer and aqueous raffinate were removed from the separatory funnel and the aqueous raffinate was analyzed by ICP. The test results, presented below in Table 1, indicated that about 84% of the tungsten and about 60% of the vanadium in the PLS were extracted into the loaded organic layer at an equilibrium pH of 5.02.

TABLE 1

| Composition of PLS and aqueous raffinate at equilibrium pH of 5.02 | | | |
|---|---|---|---|
| Metal | Initial concentration in PLS (µg/mL, ppm) | Concentration in aqueous raffinate (µg/mL, ppm) | Extraction (%) |
| V | 580 | 230 | 60.8 |
| W | 9650 | 1580 | 83.7 |
| Zn | 7840 | 3780 | 52.5 |

A second aliquot of the solution was adjusted to a pH of 0.3 and mixed with an organic extracting solvent comprising 5% by volume trioctylamine, 40% by volume Exxal 10 alcohol, and 55% by volume kerosene. An aqueous:organic volumetric ratio of 1:1 was employed. The biphasic system was stirred in a beaker with a magnetic stirrer, the system was transferred to a separatory funnel, and the layers were allowed to separate. The loaded organic layer and aqueous raffinate were removed from the separatory funnel and the aqueous raffinate was analyzed by ICP. The test results, presented below in Table 2, indicated that about 97% of the tungsten and about 45% of the vanadium in the PLS were extracted into the loaded organic layer at an equilibrium pH of 0.54.

TABLE 2

| Composition of PLS and aqueous raffinate at equilibrium pH of 0.54 | | | |
|---|---|---|---|
| Metal | Initial concentration in PLS (µg/mL, ppm) | Concentration in aqueous raffinate (µg/mL, ppm) | Extraction (%) |
| V | 590 | 320 | 45.1 |
| W | 8900 | 232 | 97.4 |
| Zn | 7760 | 6590 | 13.6 |

Example 3: Comparative Solvent Extraction in the Presence of Pentavalent Vanadium A pregnant leach solution (PLS) arising from the alkaline digestion of spent deNOx catalyst, known to contain vanadium and tungsten was provided, having a pH of 13. The pH was adjusted to 1.0 using 6N HCl. The tungsten- and non-reduced vanadium-containing solution was contacted with an extracting solvent comprising 15% v/v trioctylamine, 40% v/v Exxal 10 alcohol, and 45% v/v kerosene. The biphasic system was stirred in a beaker with a magnetic stirrer, the system was transferred to a separatory funnel, and the layers were allowed to separate. The loaded organic layer and aqueous raffinate were removed from the separatory funnel and the aqueous raffinate was analyzed by ICP. ICP results indicated that 91% extraction of the tungsten present in the PLS was achieved; however, the extraction also resulted in 87% extraction of the pentavalent vanadium present in the initial solution.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed:

1. A method of separating vanadium and tungsten, comprising:
   treating an aqueous solution comprising vanadium and tungsten with a reducing agent to reduce pentavalent vanadium to give a treated aqueous solution,
      wherein the reducing agent is selected from the group consisting of zinc, oxalic acid, iron, and sulfur dioxide, and
   mixing the treated aqueous solution with an organic solvent to form a loaded organic layer comprising 50% by weight or more of the tungsten in the aqueous solution and an aqueous raffinate having an equilibrium pH of less than about 3 and comprising 50% by weight or more of the vanadium in the aqueous solution,
      wherein the organic solvent comprises a diluent and an extractant, wherein the extractant comprises a tertiary or secondary amine; and
   separating the loaded organic layer and the aqueous raffinate.

2. The method of claim 1, wherein the aqueous solution is acidic.

3. The method of claim 1, wherein the pH of the treated aqueous solution is 0 to 5 or 0 to 3.

4. The method of claim 2, further comprising adjusting the pH of the aqueous solution or the treated aqueous solution by adding an acid to the aqueous solution or the treated aqueous solution.

5. The method of claim 1, wherein the aqueous solution comprises spent deNOx catalyst leach solution.

6. The method of claim 1, wherein the concentration of vanadium in the aqueous solution is 0.1 g/L or greater and the concentration of tungsten in the aqueous solution is 1.5 g/L or greater; or the concentration of vanadium in the aqueous solution is 0.5 g/L or greater and the concentration of tungsten in the aqueous solution is 7.5 g/L or greater, or the concentration of vanadium in the aqueous solution is 0.1 to 10 g/L and the concentration of tungsten in the aqueous solution is 1.5 to 150 g/L tungsten.

7. The method of claim 1, wherein the organic solvent further comprises a phase modifier.

8. The method of claim 1, wherein the extractant is selected from the group consisting of trioctylamine, triisooctylamine, and combinations thereof.

9. The method of claim 1, wherein the diluent comprises a hydrocarbon.

10. The method of claim 1, wherein the diluent comprises kerosene.

11. The method of claim 7, wherein the phase modifier is an alcohol or a phosphate.

12. The method of claim 1, further comprising subjecting the loaded organic layer to further purification treatment to give a tungsten-enriched material.

13. The method of claim 12, wherein the further purification treatment comprises stripping the loaded organic layer by contacting the loaded organic layer with an aqueous stripping solution to give a strip raffinate comprising the tungsten.

14. The method of claim 13, wherein the aqueous stripping solution comprises ammonium hydroxide.

15. The method of claim 13, wherein the further purification treatment further comprises scrubbing the loaded organic layer prior to stripping by mixing the loaded organic layer with an aqueous scrubbing solution to give a scrubbed organic comprising the tungsten.

16. The method of claim 15, wherein the aqueous scrubbing solution comprises hydrochloric acid, sulfuric acid, or a combination thereof.

17. The method of claim 12, wherein, following the further purification treatment, the tungsten-enriched material comprises 25% by weight or less of the vanadium in the aqueous solution; 15% by weight or less of the vanadium in the aqueous solution; or 5% by weight or less of the vanadium in the aqueous solution.

18. The method of claim 12, wherein the further purification treatment comprises removal of at least a portion of any impurities in the loaded organic layer, wherein the impurities are selected from the group consisting of zinc, molybdenum, aluminum, calcium, chromium, iron, magnesium, manganese, sodium, phosphorus, sulfur, silicon, titanium, zirconium, and combinations thereof.

19. The method of claim 18, wherein the further purification treatment further comprises a concentrating step to give the tungsten-enriched material, wherein the tungsten-enriched material comprises 15% by weight or less of the impurities or 5% by weight or less of the metal impurities.

20. The method of claim 1, further comprising treating the aqueous raffinate to give a vanadium-enriched material.

21. The method of claim 20, wherein the treating comprises mixing the aqueous raffinate with a phosphoric acid-containing extractant to give the vanadium-enriched material.

22. The method of claim 21, wherein the phosphoric acid-containing extractant comprises diethylhexyl phosphoric acid.

23. The method of claim 1, wherein the aqueous solution comprises:
   an aqueous pregnant leach solution arising from the alkaline digestion of spent DeNOx catalyst, comprising vanadium and tungsten;
   and wherein the method comprises:
   modifying the pH of the aqueous solution to provide an acidic aqueous solution;
   treating the acidic aqueous solution with a reducing agent to reduce pentavalent vanadium, giving the treated aqueous solution;
   mixing the treated aqueous solution with an organic solvent to give the loaded organic layer and the aqueous raffinate;
   separating the loaded organic layer and the aqueous raffinate;
   contacting the loaded organic layer with an aqueous scrubbing solution to give a scrubbed organic;
   contacting the scrubbed organic with an aqueous stripping solution to give a stripping raffinate; and
   concentrating the stripping raffinate to provide a tungsten-enriched material, wherein the tungsten-enriched material comprises 50% by weight or more of the tungsten in the pregnant leach solution and 50% by weight or less of the vanadium in the pregnant leach solution.

24. The method of claim 1, wherein the aqueous solution comprises an aqueous pregnant leach solution arising from the alkaline digestion of spent DeNOx catalyst.

25. The method of claim 1, wherein the pH of the treated aqueous solution is less than about 0.5.

* * * * *